UNITED STATES PATENT OFFICE.

JAMES E. SUMMERS, OF RICHMOND, VIRGINIA, ASSIGNOR TO THE AMERICAN CHAMPION PLASTER COMPANY, OF SAME PLACE.

PLASTERING COMPOUND.

SPECIFICATION forming part of Letters Patent No. 558,434, dated April 14, 1896.

Application filed October 2, 1895. Serial No. 564,451. (No specimens.)

*To all whom it may concern:*

Be it known that I, JAMES E. SUMMERS, of Richmond, in the county of Henrico and State of Virginia, have invented a new and useful Improvement in Plastering Compounds, of which the following is a specification.

The object of my invention is to provide an improved plastering compound designed to produce a gray finish, and a rough but attractive surface when left by the float, the same being particularly desirable for churches, offices, public buildings, and the like.

It consists of crushed slag, plaster-of-paris, dry-slaked lime, and the flour from grain, in the following proportions: crushed slag, seventy-five pounds; plaster-of-paris, eighteen pounds; slaked lime, six pounds; wheat-flour, one pound. In preparing these ingredients the slag is crushed, ground, or pulverized, so that none of its particles shall be coarser than sea-sand, and not over twenty-five per cent. thereof shall be as coarse. The lime is dry-slaked, and the proportion indicated is that of the lime after dry-slaking has been completed.

The above ingredients are thoroughly mixed to form a homogeneous dry compound which is shipped and sold in this condition.

Four pounds of this material covers one square yard, or one ton covers five hundred square yards.

When applied over a first or second coat of plaster as a finishing-coat, it sets and dries quickly, but not too quickly to be conveniently applied, and forms a very solid and hard finish which does not crack or "pop," and is a very cheap and durable finishing-coat of the kind desired.

I am aware that the ingredients named have been used in other and various combinations in the manufacture of plastering compounds; but I do not know that all of the ingredients named have been used together in or about the proportions described, and it is this special composition which I find gives results of greatest excellence and distinctive value.

Having thus described my invention, what I claim as new, and desire to secure by Letters Patent, is—

A gray finish plastering compound consisting of crushed slag, plaster-of-paris, slaked lime, and the flour of grain, mixed in or about the proportions described.

JAMES E. SUMMERS.

Witnesses:
   J. H. OGBURN,
   RICHARD EPPES.